United States Patent [19]

Allard et al.

[11] 4,176,785
[45] Dec. 4, 1979

[54] AUTOMATIC TEMPERATURE CONTROLLER WITH NIGHT SETBACK AND OPERATING AS A FUNCTION OF OUTSIDE AIR

[75] Inventors: John J. Allard, Mishicot; James R. Montz, Two Rivers, both of Wis.

[73] Assignee: AMF Incorporated, White Plains, N.Y.

[21] Appl. No.: 946,229

[22] Filed: Dec. 27, 1978

[51] Int. Cl.² .................... F23N 5/20; G05D 23/00
[52] U.S. Cl. ............................. 236/46 R; 236/91 R
[58] Field of Search ............ 236/46 R, 47, 91 F, 236/91 G, 91 R; 337/301–303; 165/12

[56] References Cited
U.S. PATENT DOCUMENTS

| 2,174,558 | 10/1939 | Gunther | 236/46 R |
| 2,333,319 | 11/1943 | Kucera | 236/46 R X |
| 2,604,267 | 7/1952 | Smith | 236/46 R |
| 3,317,692 | 5/1967 | Duncan | 337/301 |
| 3,964,676 | 6/1976 | Rooks et al. | 236/47 X |

*Primary Examiner*—William E. Wayner
*Attorney, Agent, or Firm*—George W. Price; John H. Gallagher

[57] ABSTRACT

An automatic temperature control system for a building that includes a night setback feature and a morning pickup feature that operates as a function of outside air temperature and wind velocity. A seven day time scheduler and a short cycle auxiliary timer control the system operation. System automatically resumes proper scheduled operation following power failure that does not exceed mechanical carry-over time of seven day time scheduler.

13 Claims, 12 Drawing Figures

AUTOMATIC TEMPERATURE CONTROLLER WITH NIGHT SETBACK AND OPERATING AS A FUNCTION OF OUTSIDE AIR

The present invention relates to an improved automatic temperature control system for a building. The system automatically lowers the temperature when the building is unoccupied or the occupants are asleep, i.e., at night and on weekends for commercial buildings, and turns on the heat very early in the morning so that the temperature rises to the desired daytime temperature by the time the building is occupied. The time that it will take a cooled-off building to come up to the desired daytime temperature is a function of the building characteristics and of the outside air temperature and wind velocity. The present system senses the outside temperature and wind conditions and automatically adjusts the system operation to turn on the heat either earlier or later in the early morning hours in order to have the building at the desired temperature at occupancy time, but not appreciably before that time. The system also includes means for controlling the intake of fresh air in a manner that is compatible with comfort and health requirements.

The system of the present invention requires relatively simple mechanical and electrical apparatus and is flexible and easily adjusted in its operation. The system automatically recovers to place itself in automatic operation after power failure and after a nighttime setback of temperature has been aborted.

The invention will be explained by first describing the system concept and its operation, and then the physical apparatus for carrying out the system operation will be described.

In the example chosen for discussion herein, it is assumed that the building is a commercial building that is occupied from 8:00 o'clock a.m. until 5:00 o'clock p.m., Monday through Friday, inclusive. The building is unoccupied on weekends. Furthermore, it is assumed that operation is during winter months when days are normally warmer than nights. In the assumed example, the system controls a heating unit such as a gas or oil fired furnace.

Accordingly, it is desired that a 5:00 o'clock p.m. each weekday the building temperature be set back to a lower nighttime temperature. Sometime prior to morning occupancy the heat is turned on so that the building temperature is at the desired daytime temperature by the time employees arrive for work at 8:00 o'clock a.m. As is conventional in systems of this general type, the heating system is provided with a day thermostat that controls the building temperature to hold it at a higher daytime temperature, and is provided with a separate night thermostat that is operative during the unoccupied period of the building to maintain the building at a lower nighttime temperature.

The invention will be described in connection with the accompanying drawings wherein.

Figure 1:
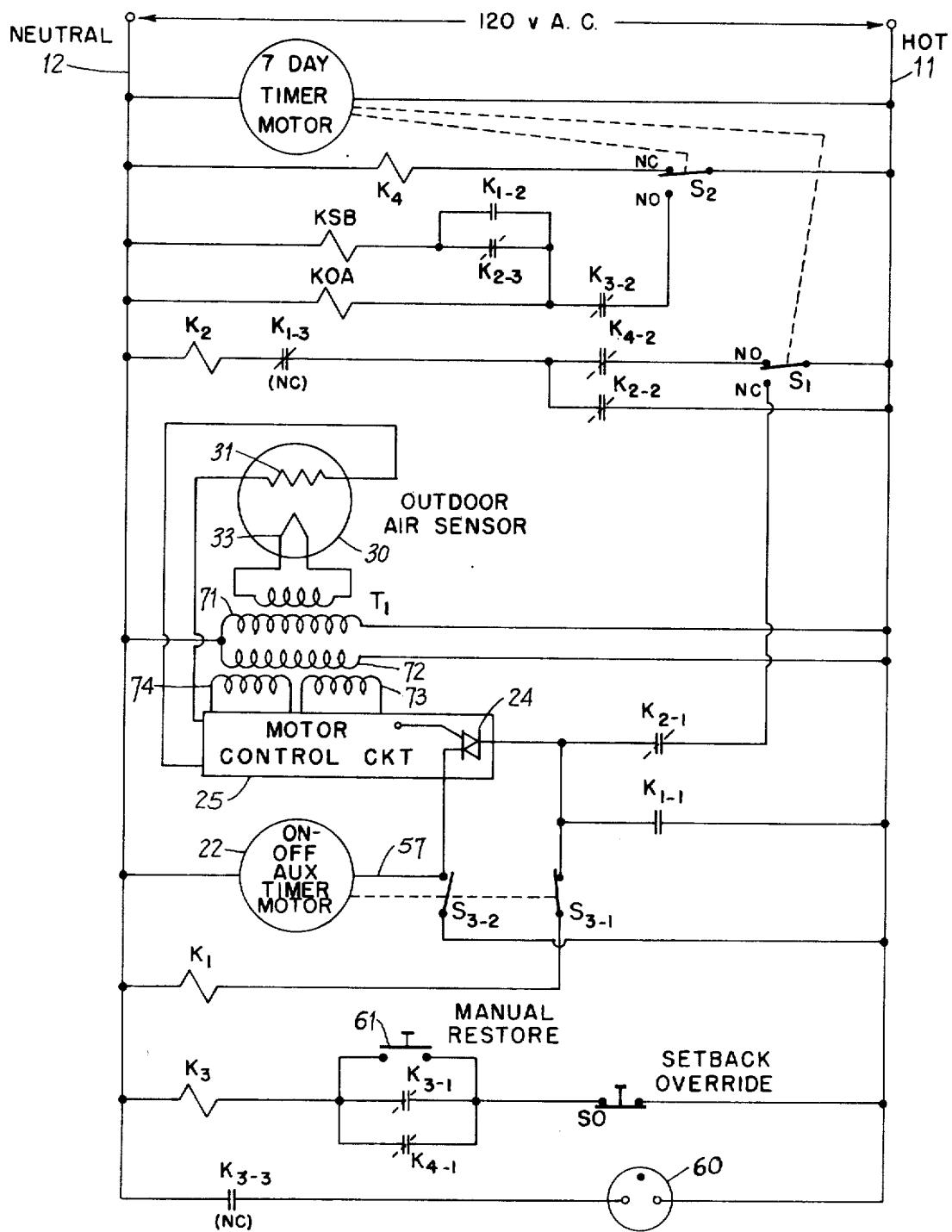
FIG. 1 is a schematic wiring diagram of the temperature control system of the present invention illustrating the system in its daytime operating condition on days the building is occupied.
Figure 2A:
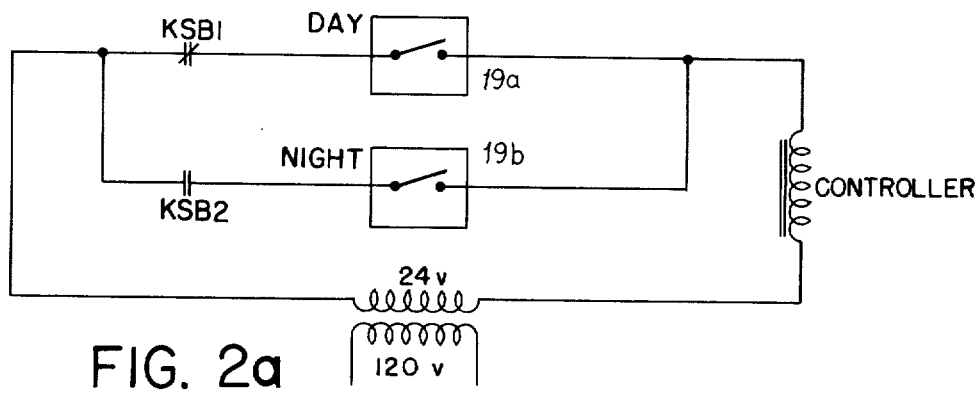
FIGS. 2a and 2b are simplified illustrations schematically showing apparatus that is controlled by the system of FIG. 1.
Figure 2B:
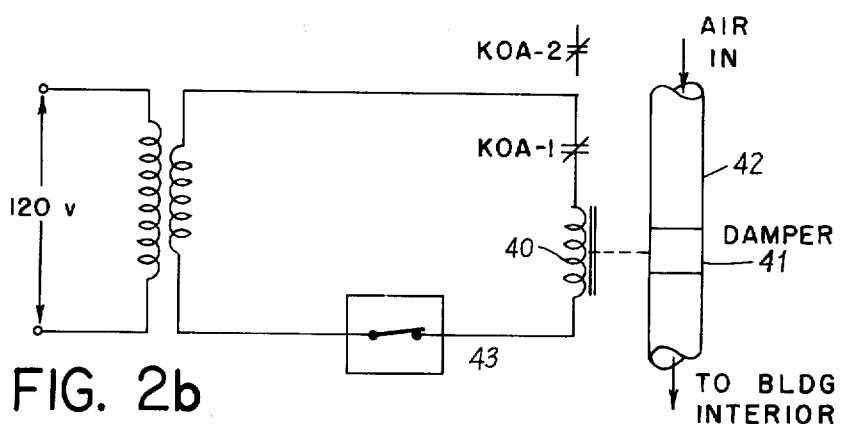
Figure 3:
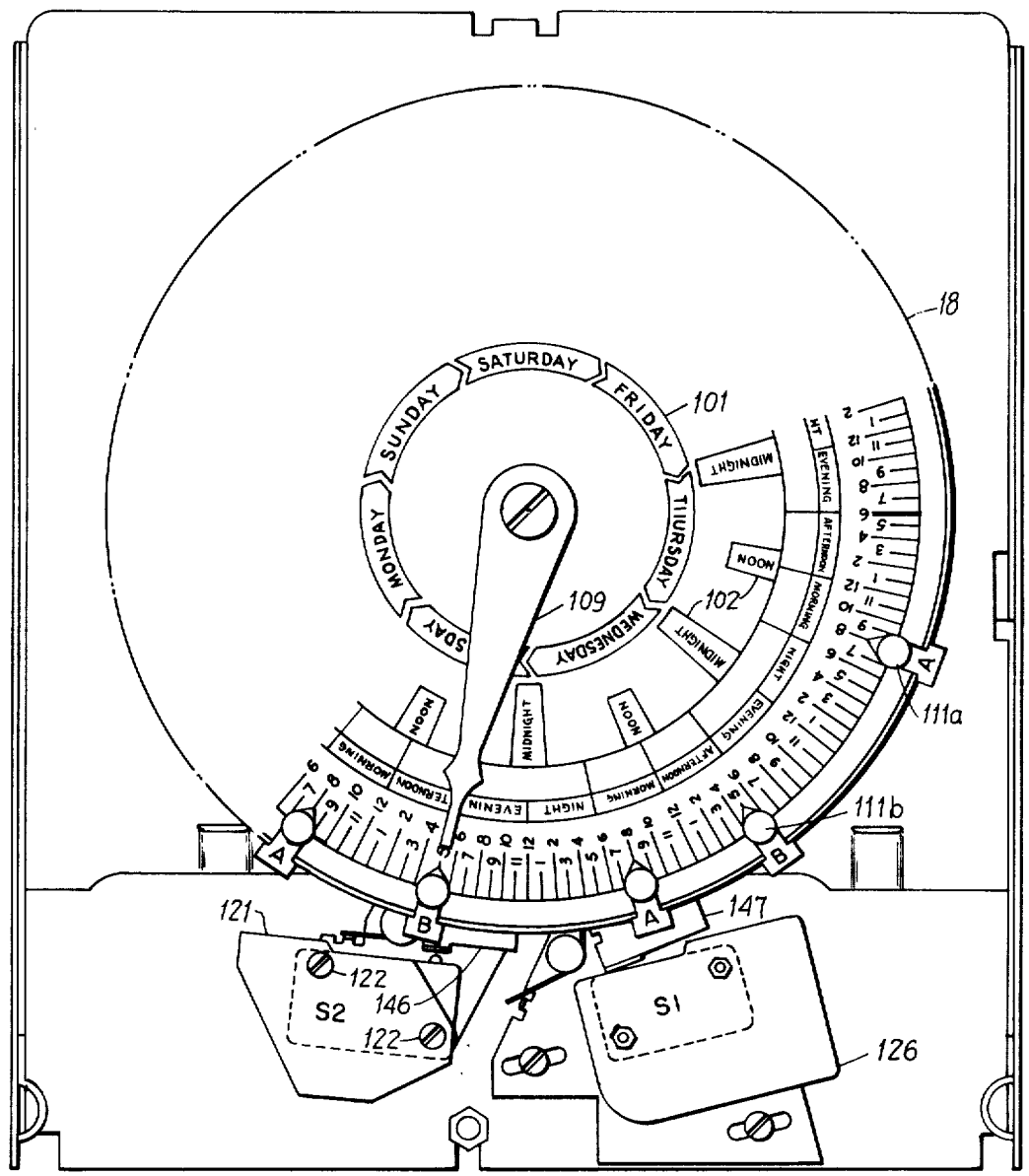
FIG. 3 is an illustration of a seven day time scheduler 15 that is employed in the system of FIG. 1.

FIGS. 1, 2a and 2b are schematic wiring diagrams illustrating the system in its daytime condition in which it is providing heat and fresh air for the occupied building. In FIG. 1, the control system is comprised of hot and neutral conductors 11 and 12 that are coupled to a 120 volt a.c. supply system. The synchronous motor for a seven day time scheduler 15 (7 day timer motor) is connected across supply conductors 11 and 12. As illustrated in FIG. 3, seven day time scheduler 15 is of a type that has a large disc dial 18 that makes one complete revolution in seven days. The dial is divided into seven equal parts, one for each day of the week, and the segment for each day is further divided into fifteen minute increments by the marks along the outer periphery of dial 18. An A tripper and a B tripper are positioned at respective predetermined time locations on each day segment of dial 18 for each day that the building is to be occupied. Two separate single pole, double throw switches $S_1$ and $S_2$ are positioned at predetermined spaced apart locations adjacent the path of the trippers so that each switch is transferred through one complete switching cycle once each day that the building is occupied. Details of the switch actuating mechanisms will be described in detail below. Trippers are omitted from the segments of the dial that correspond to days that the building will be unoccupied. In FIG. 3, only five trippers are illustrated and only a portion of the outer periphery of dial 18 is illustrated in detail in order to simplify the drawings and the description. The seven day time scheduler 15 is a Model X-7814 Seven Day Time Control, manufactured by Paragon Electric Company, Two Rivers, Wis.

Returning to FIG. 1, during daytime hours switch $S_2$ (on seven day time scheduler 15) is in its normally closed (NC) position and relay winding $K_4$ is energized. Relay contacts $K_{4\text{-}1}$ near the bottom of FIG. 3 thus are closed to energize relay winding $K_3$ through the normally closed Set Back Override switch SO. Holding contacts $K_{3\text{-}1}$ are closed to maintain relay $K_3$ energized.

Relay contacts $K_{4\text{-}2}$ near the middle of FIG. 1 are closed, as are the normally closed contacts $K_{1\text{-}3}$. Switch $S_1$ (on seven day time scheduler 15) is closed in its normally open (NO) position during the daytime setting so that relay winding $K_2$ is energized. Holding contacts $K_{2\text{-}2}$ are closed to maintain relay $K_2$ energized as long as contacts $K_{1\text{-}3}$ remain closed.

Temperature setback relay KSB is connected in series with closed contacts $K_{2\text{-}3}$ and $K_{3\text{-}2}$ and with the normally open contact (NO) of timer switch $S_2$. During the daytime setting of switch $S_2$ the NO contact is open so that relay coil KSB is unenergized. Normally open contacts K$_{1-2}$ are in parallel with contacts K$_{2-3}$, and are open at this time because relay coil K$_1$ is not energized.

Relay coil KSB controls contacts KSB-1 and KSB-2, FIG. 2a, in a circuit that connects either the daytime thermostat 19a or the nighttime thermostat 19b in circuit with a controller 20. Controller 20 might be a solenoid that controls a fuel valve and ignitor for a furance, for example. Contacts KSB-1 normally are closed so that when relay KSB is not energized (during daytime hours) the daytime thermostat 19a is in the circuit. When relay coil KSB is energized, contacts KSB-1 open and contacts KSB-2 close to connect the night thermostat in circuit with controller 20. FIG. 2a is a simplified illustration representing possible uses of contacts KSB-1 and KSB-2.

Relay coil KOA is connected between neutral conductor 12 and contacts K$_{3-2}$. This relay controls the dampers in air ducts that admit outside air to the building. During daytime operation, relay KOA is not energized because timer switch S$_2$ is not closed on the NO contact that is in series with the coil of relay KOA. As illustrated in FIG. 2b, relay contacts KOA-1 normally are closed so that current flows through a solenoid 40, for example, that opens the damper 41 in air duct 42. A thermostat 43 located within the building is in series with contacts KOA-1 and solenoid 40. This arrangement causes fresh air to be admitted to the building during daylight hours when the interior temperature exceeds a predetermined limit. The arrangement of FIG. 2b is a simplified illustration offered only to show a possible usefulness of contacts KOA-1. Other arrangements for fresh air control may be employed. Because this feature itself is not the subject of the present invention further examples or explanations will not be given.

Relay coil K$_1$ has one side connected to neutral conductor 12 and its other side connected to the movable contact of single pole, single throw switch S$_{3-1}$. Switch S$_{3-1}$ is ganged with single pole, single throw switch S$_{3-2}$, and both are operated by ON-OFF auxiliary timer 22. During daytime operation, switch S$_{3-1}$ is closed and switch S$_{3-2}$ is open. The fixed contact of switch S$_{3-1}$ is connected to open contacts K$_{1-1}$ and to the closed contacts K$_{2-1}$. Because the normally closed contacts NC of timer switch S$_1$ is open during daytime operation, relay coil K$_1$ is unenergized.

ON-OFF auxiliary timer motor 22 is connected between neutral conductor 12 and one of the power terminals of a semiconductor triac device 24. The other power terminal of triac 24 is connected to the parallel connected contacts K$_{2-1}$ and K$_{1-1}$. The gate electrode of triac 24 is connected to a terminal of motor control circuit 25. Consequently, the conduction of triac 24 and thus the running of auxiliary motor 22 is under control of motor control circuit 22. Of course, a complete conduction path must exist from auxiliary motor 22 to hog supply conductor 11 by way of contacts K$_{2-1}$ or K$_{1-1}$, or by way of switch S$_{3-2}$.

Motor control circuit 25 is illustrated in detail in FIG. 7 and its operation will be explained below. Briefly stated, the circuit continuously cycles between two conditions, wherein one condition causes triac 24 to conduct and the other condition causes triac 24 to be nonconductive. The off times of triac 24 are a function of the outside air temperature and wind velocity, as monitored by outdoor air sensor 30 that is mounted in an exposed location outside the building whose temperature is to be controlled. Outside air sensor 30 includes a temperature sensing element 31 such as a thermistor element whose electrical resistance is a function of its temperature. As the outside air temperature feels colder, triac 24 is caused to be off for shorter periods of time. The on times of triac 24 are a fixed time. The conduction of triac 24 causes auxiliary timer motor 22 to be energized when a conduction path exists to hot conductor 11. A suitable outside air sensing unit is obtainable from Paragon Electric Company as part number 25019.

Transformer T$_1$ has a pair of primary windings 71 and 72 connected in parallel between power supply conductors 11 and 12. One secondary winding of transformer T$_1$ is connected to a heater element 33 in outside air sensor 30. A pair of secondary windings 73 and 74 of transformer T$_1$ are coupled to motor control circuit 25, as will be explained in detail below.

Figure 4:
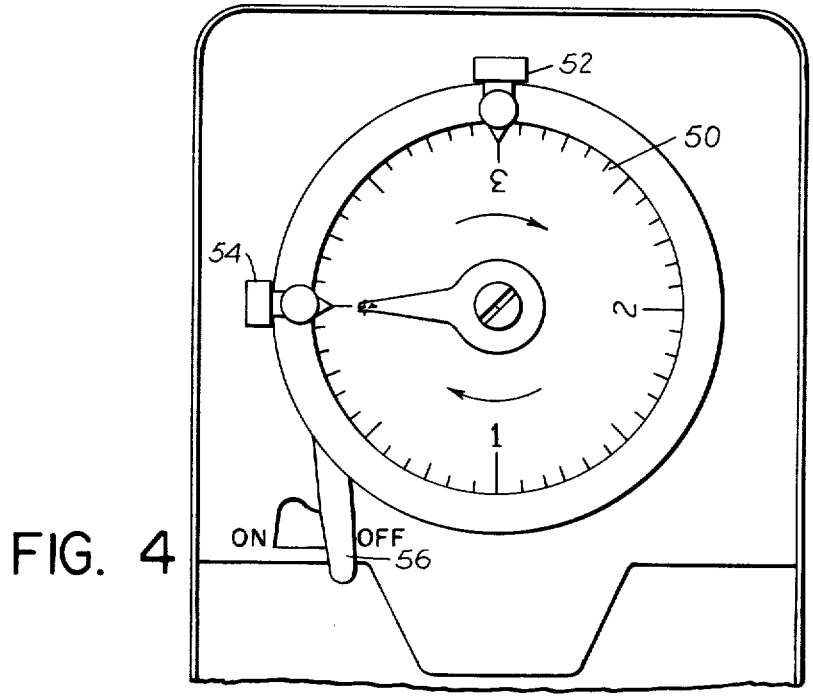
FIG. 4 is an illustration of an auxiliary timer 22 that is used in the system of FIG. 1.

ON-OFF auxiliary timer motor 22 is a synchronous motor that is part of a time controller or scheduler that is illustrated in FIG. 4. This device is manufactured by Paragon Electric Company, Two Rivers, Wis., and is identified as Model X-7864. This auxiliary timer is substantially identical to the one described in U.S. Pat. No. 3,052,765—Everard et al, with the exception that the motor and gear train have been changed so that the time dial 50 makes one complete revolution in four hours of continuous running rather than 24 hours of continuous running. One other exception is that the set of contacts (S$_{3-1}$) is normally closed and the other set (S$_{3-2}$) is normally open. A settable ON tripper 52 is secured to the periphery of time dial 50 at the three hour mark, and a settable OFF tripper 54 is secured to the periphery of dial 50 at the four hour mark. As explained in the above mentioned patent, ON tripper 52 throws switch actuator 56 to the left to change the switching conditions of contacts S$_{3-1}$ and S$_{3-2}$, and OFF tripper 54 throws actuator 56 to the right to reverse the switching conditions of contacts S$_{3-1}$ and S$_{3-2}$.

Because motor control circuit 25 causes triac 24 to repetitively turn on and off with a duty cycle that is a function of the sensed outside air, auxiliary timer motor 22 will be energized and deenergized in a corresponding manner, but only so long as its terminal 57 is connected to the hot supply conductor 11. Consequently, the time dial 50 of auxiliary timer 22 will make one complete revolution in a total running time of four hours. But depending on the outside temperature and wind, it may require up to ten hours of on and off operation to accumulate a total of four hours of ON time.

At the bottom of FIG. 1, a neon bulb 60 is illustrated in series with contacts K$_{3-3}$. An open manual restore switch 61 is illustrated in series with the setback override switch SO. The functions of these items will be described below.

In the operation of the temperature controller of this invention during daylight hours of occupancy, FIG. 1, switch S$_2$ located on seven day time scheduler 15 is closed in its NC position so that both relays KSB and KOA are unenergized. Accordingly, in FIG. 2a, contacts KSB-1 are closed to operatively connect day thermostat 19a in circuit with the controller means 20 and a source of 24 volt power. Contacts KSB-2 are open, thus keeping night thermostat 19b out of the circuit.

In FIG. 2b, contacts KOA-1 will be in their normally closed condition to activate the damper control solenoid 40 when inside thermostat 43 closes. Thus, outside air is admitted to the occupied building on command.

NIGHT SETBACK OPERATION

Figure 5:
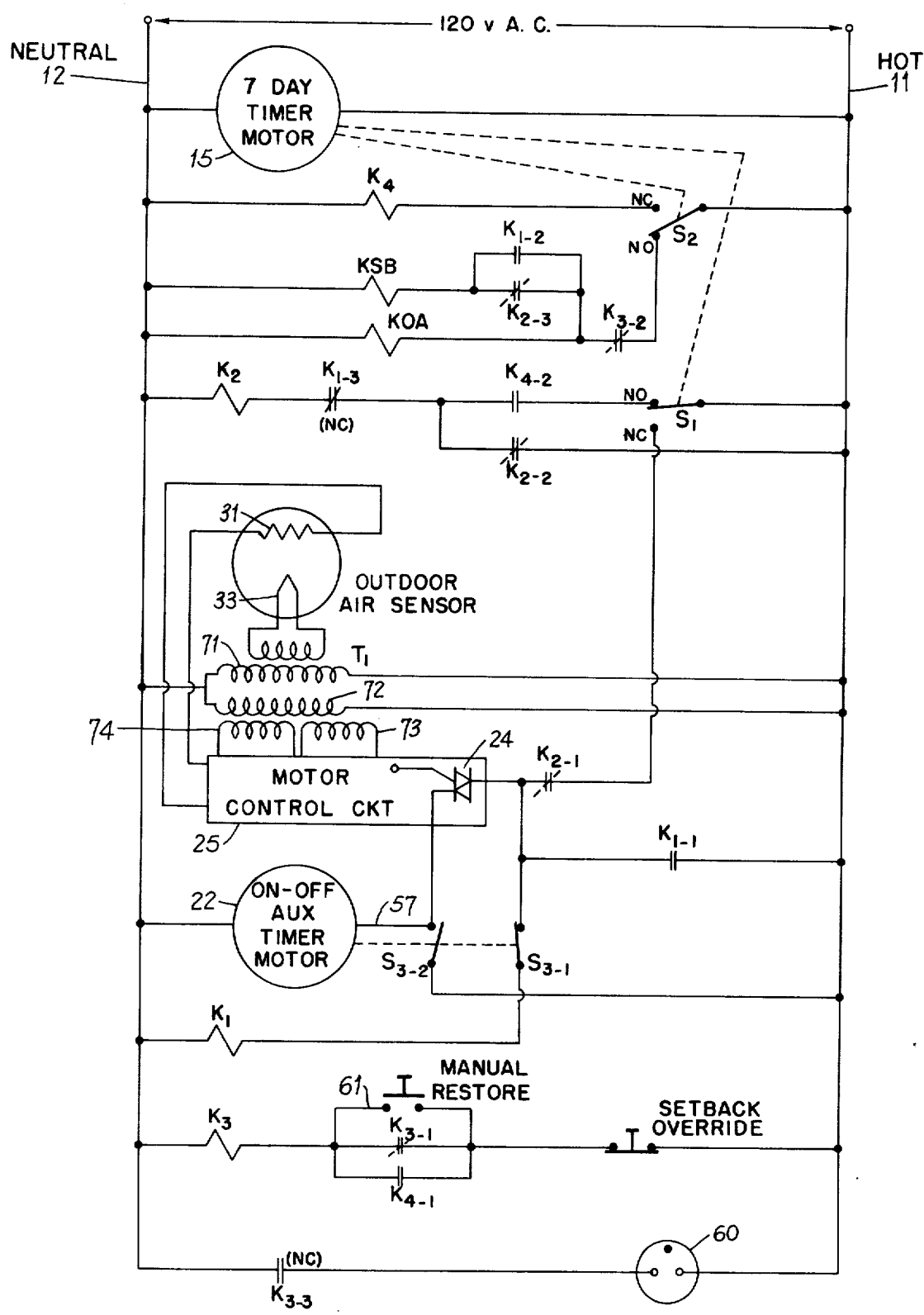
FIGS. 5 and 6 are schematic wiring diagrams of the system of this invention showing the system in its night setback condition and its morning pickup condition, respectively.

At the end of the working day at 5:00 o'clock p.m. on Tuesday, for example, see FIG. 3, the B tripper transfers time switch $S_2$ to close the NO contacts, FIG. 5, and open the NC contacts. Setback relay KSB now is energized through closed contacts $K_{2-3}$, $K_{3-2}$, and the NO contact of time switch $S_2$. In FIGS. 2a, contacts KSB-1 open to disconnect day thermostat 19a from the circuit. Contacts KSB-2 close to connect night thermostat 19b in circuit with temperature controller means 20. Now the temperature inside the building will be maintained at a lower temperature by the appropriately adjusted night thermostat 19b.

Returning to FIG. 5, outside air relay KOA also is energized through contacts $K_{3-2}$ and the NO contact of time switch $S_2$. In FIG. 2b, contacts KOA-1 open to disable solenoid 40 and cause damper 41 to close. This prevents outside air from flowing into the building through duct 42.

The transfer of time switch $S_2$ at 5:00 o'clock p.m. deenergizes relay winding $K_4$, FIG. 5, so that its contacts $K_{4-1}$ and $K_{4-2}$ open. Relay winding $K_2$ remains energized through normally closed contacts $K_{1-3}$ and its holding contacts $K_{2-2}$. Relay winding $K_3$ also remain energized through its holding contacts $K_{3-1}$ and normally closed set-back override switch SO.

Because time switch $S_1$ remains closed in its NO position, and because relay $K_1$ still is unenergized, and because auxiliary timer switch $S_{3-2}$ is open, auxiliary timer motor 22 remains unenergized.

With the night setback condition illustrated in FIG. 5 the building will cool off to its nighttime temperature.

EARLY MORNING TEMPERATURE PICKUP

At sometime Tuesday night that is approximately 11 hours before the building is to be occupied on Wednesday morning, i.e., at approximately 9:00 o'clock p.m. Tuesday night, the A tripper on seven day time scheduler 15, FIG. 3, causes time switch $S_1$ to transfer to its NC position, see FIG. 6. Auxiliary timer motor 22 now is connected between supply conductors 11 and 12 by way of lead 57, triac 24 in motor control circuit 25, closed contacts $K_{2-1}$, and the NC contacts of time switch $S_1$. Therefore, when motor control circuit 25 causes triac 24 to turn on, auxiliary timer motor 24 will be energized and will rotate its time dial 50. It will be explained in detail below that motor control circuit 25 operates as a function of sensed outside air temperature and wind to repetitively turn auxiliary timer motor 22 on and off. As the outside air temperature decreases, the OFF time of the motor decreases.

Returning to FIG. 6, relay winding $K_1$ now is energized through auxiliary timer switch $S_{3-1}$, closed contacts $K_{2-1}$, and the NC contact of timer switch $S_1$. Holding contacts $K_{1-1}$ closes to hold winding $K_1$ in its energized condition.

Normally closed contacts $K_{1-3}$ open and deenergize relay winding $K_2$. Its holding contacts $K_{2-2}$ open, as does its contacts $K_{2-3}$ in series with setback relay KSB. Because relay $K_1$ now is energized, contacts $K_{1-2}$ close to maintain setback relay KSB in its energized condition. Relay KOA remains energized through closed contacts $K_{3-2}$.

Relay $K_3$ remains energized and relay $K_4$ remains unenergized because timer switch $S_2$ is closed on its NO contact.

Auxiliary timer motor 22 runs intermittently, as a function of temperature, until it has run an accumulated time of three hours. At that time tripper 52, FIG. 4, on dial 50 throws switch lever 56 to open auxiliary timer switch $S_{3-1}$ and close auxiliary timer switch $S_{3-2}$, FIG. 6. The opening of switch $S_{3-1}$ deenergizes relay winding $K_1$ and causes its holding contacts $K_{1-1}$ to open as well as its contacts $K_{1-2}$ that are maintaining setback relay KSB energized. KSB is deenergized and its contacts KSB-1 close, FIG. 2a, and its contacts KSB-2 open. The day thermostat 19a that is at the higher temperature setting is again connected into circuit with temperature controller 20. The heating unit for the building therefore will turn on if it is not then on and the building temperature will begin to rise toward the daytime temperature that is set on day thermostat 19a.

The closing of auxiliary timer switch $S_{3-2}$ after three accumulated hours of ON-OFF running directly connects terminal 57 of auxiliary timer motor to hot supply conductor 11, thereby continuously energizing the auxiliary motor. Auxiliary timing motor 22 continuously runs for an additional hour until it reaches 4 hours on the time dial. At that time OFF tripper 54 throws actuating lever 56 to the right to transfer auxiliary timer switch $S_{3-1}$ to its closed position and auxiliary timer switch $S_{3-2}$ to its open position, see FIG. 6. The opening of switch $S_{3-2}$ deenergizes auxiliary timer motor 22.

It will be noted from FIG. 4 that the auxiliary motor has shut itself off at a time where it is ready to commence the next intermittent ON-OFF operation during the next temperature pickup time. For this reason, no reset mechanism or apparatus is required for auxiliary timer 22. This is an improvement over many temperature control systems of similar types that require the auxiliary timer means to be set back to a starting position in a separate and distinct rewind or reset operation.

Experience has shown that most buildings will warm up to desired daytime temperatures within eight hours, even in cold weather. Accordingly, deenergization of setback relay KSB may occur as much as 8 hours earlier than the building is to be occupied. In the example assumed here, i.e., morning occupancy is to be at 8:00 o'clock a.m., the setback relay KSB may be deenergized as early as midnight to start heating the building for the next day's occupancy. This would be an extreme case and usually the pickup, or warm up, time is shorter.

The above relationship dictates that timer switch $S_1$ on seven day timer scheduler 15 be tripped to its NC position eleven hours before morning occupancy. That is, eight hours for maximum warm up time, plus the previous three hours running time of auxiliary timer 22 before tripper 52 trips actuator 56 to open switch $S_{3-1}$.

The B tripper for Wednesday, FIG. 3, next engages the actuator of timer switch $S_1$ to close switch $S_1$ on its NO contact. Nothing happens at this time because contacts $K_{4-2}$ and $K_{2-2}$ are open to keep relay winding $K_2$ deenergized. Relays $K_4$ and $K_1$ still are deenergized.

The A tripper for Wednesday next engages the actuator for switch $S_2$ to close the switch on its NC contact, thereby deenergizing relay KOA. In FIG. 2b, this closes contacts KOA-1, assuming inside thermostat 43 is closed, and energizes solenoid 40 to open damper 41. This admits fresh air to the building. The time of day that the A tripper of seven day time scheduler 15 actuates timer switch $S_2$ to deenergize relay KOA is approximately 8:00 o'clock a.m.

Referring to FIG. 5 that shows the system in the night setback condition, relay KSB is energized through contacts K$_{2-3}$, K$_{3-2}$ and the NO contact of timer switch S$_2$. Referring to the bottom portion of FIG. 5 it is seen that the normally closed, manually operated, momentary operating setback override switch SO maintains relay winding K$_3$ energized. The night setback operation may be overridden, or aborted, by pushing switch SO to open its contacts. Relay winding K$_3$ is deenergized and its contacts K$_{3-2}$ open to deenergize setback relay KSB. This closes contacts KSB-1, FIG. 2a, and opens contacts KSB-2 to connect day thermostat 19a in circuit with temperature controller 20. Holding contacts K$_{3-1}$ also open to keep relay winding K$_3$ deenergized.

When relay K$_3$ is deenergized its normally closed contacts K$_{3-3}$ close to energize neon lamp 60, thus providing a visual indication of the setback override.

After setback override switch SO is again closed the setback operation may be restored, if desired, by closing the normally open, manually operated, momentary operating, manual restore switch 61 that shunts holding contacts K$_{3-1}$. Relay K$_3$ now is energized and its holding contacts K$_{3-1}$ close. Its contacts K$_{3-2}$ also close to reenergize setback relay KSB and outside air relay KOA. The system is now in the night setback condition.

When power fails on supply conductors 11 and 12, relay K$_3$ is deenergized. Its holding contact K$_{3-1}$ open and its normally closed contacts K$_{3-3}$ close. If timer switch S$_2$ is closed on its NO contact, i.e., during the time that the building is unoccupied, neon bulb 60 will light when power is restored.

An advantageous feature of the system of this invention is that the system automatically recovers to resume its proper automatic operation after a power failure, provided the power failure does not last longer than the 10 hours of running time that is provided by the spring operated carry-over apparatus of seven day time scheduler 15. Timer switches S$_1$ and S$_2$ will continue to operate on schedule since the carry-over feature of seven day timer 15 maintains operation of scheduler 15. If power fails and returns during daytime hours while the system is in its daytime mode of operation, FIG. 1, system operation resumes without incident. This results from the fact that timer switch S$_2$ is closed on its NC contact and will cause relay winding K$_4$ to be energized as soon as power is restored. Contacts K$_{4-1}$ will close to energize relay winding K$_3$. Contacts K$_{4-2}$ will close to energize relay K$_2$ through normally closed contacts K$_{1-3}$ and the NO contact of switch S$_1$. This is the desired daytime condition of the system.

Figure 6:
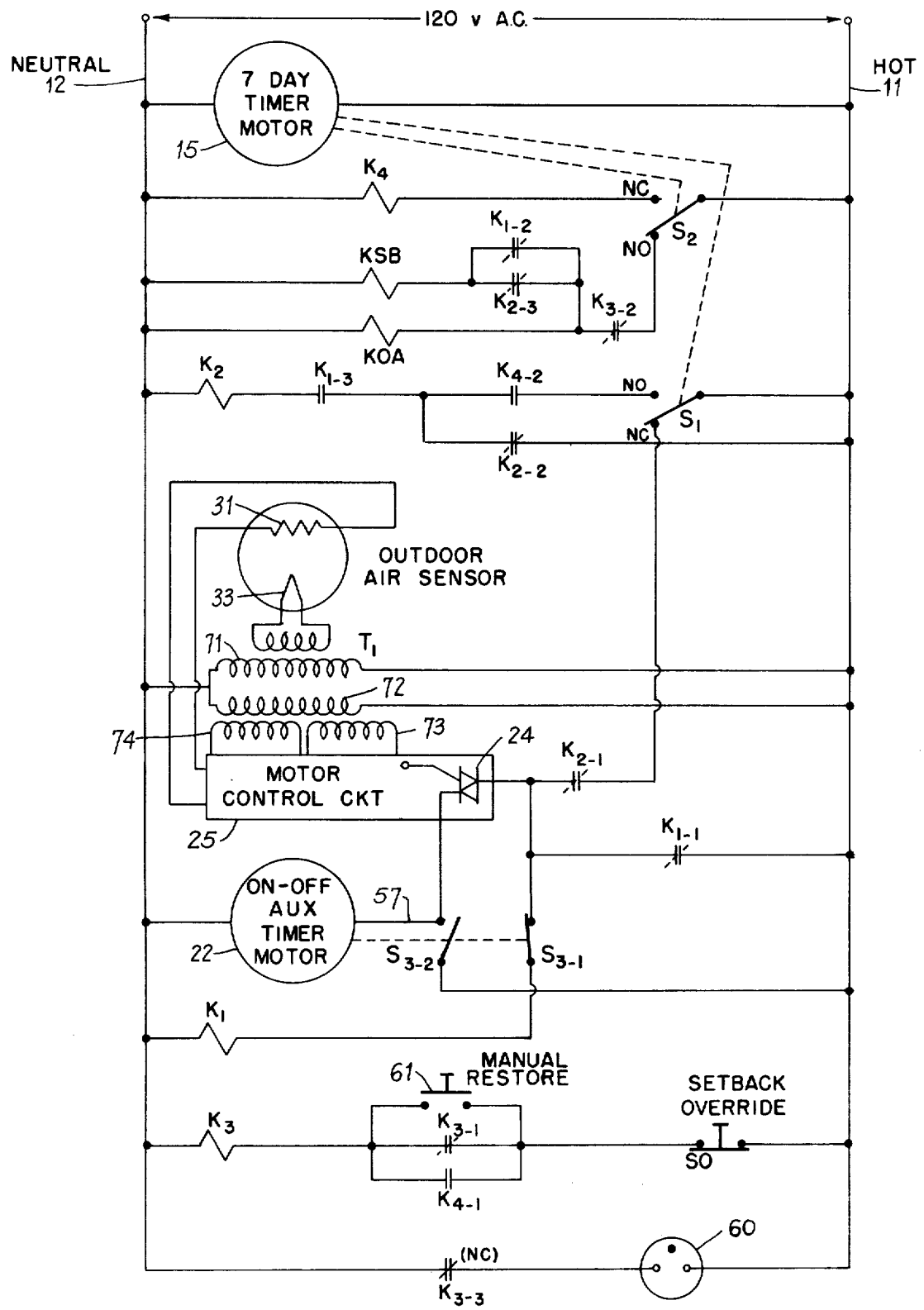

Should a power failure occur and be restored when the system is in the night setback condition of FIG. 5 or the morning pickup condition of FIG. 6, timer switch S$_2$ is closed in its NO position and relay winding K$_4$ will not be energized. Its contacts K$_{4-1}$ and K$_{4-2}$ will remain open so that relay windings K$_2$ and K$_3$ remain unenergized. Contacts K$_{3-2}$ remain open and setback relay KSB and outside air relay KOA remain unenergized. In FIGS. 2a and 2b it is seen that normally closed contacts KSB-1 and KOA-1 will be closed to place the heating system in its daytime operation.

From the above examples it is seen that startup from power failure places the heating system in daytime operation. This is a safety feature to minimize the possibility of damage resulting from prolonged cooling of the building and to minimize physical discomfort.

If the power failure occurs and is restored when timer switch S$_1$ is closed on its NC contact and before auxiliary timer 22 has completed its cycle of operation, the complete recovery of auxiliary timer to its starting position will begin immediately if auxiliary timer switch S$_{3-2}$ has already closed. If auxiliary timer switch S$_{3-2}$ has not yet closed and timer switch S$_1$ will transfer back to its NO position before auxiliary timer 22 completes its cycle, the auxiliary timer 22 will remain in an intermediate position until timer switch S$_1$ closes the next night. The initial delay period of the morning pickup will be short that next night after power resumption, but the system will be back on the correct schedule thereafter. Such operation the first night after power is restored results in the daytime conditions being established earlier in the warm up period than necessary, but this probably is safer and more comfortable to occupants. The important feature is that the system automatically restores itself to proper scheduled operation and it is not necessary for an attendant to reset the system.

Figure 7:
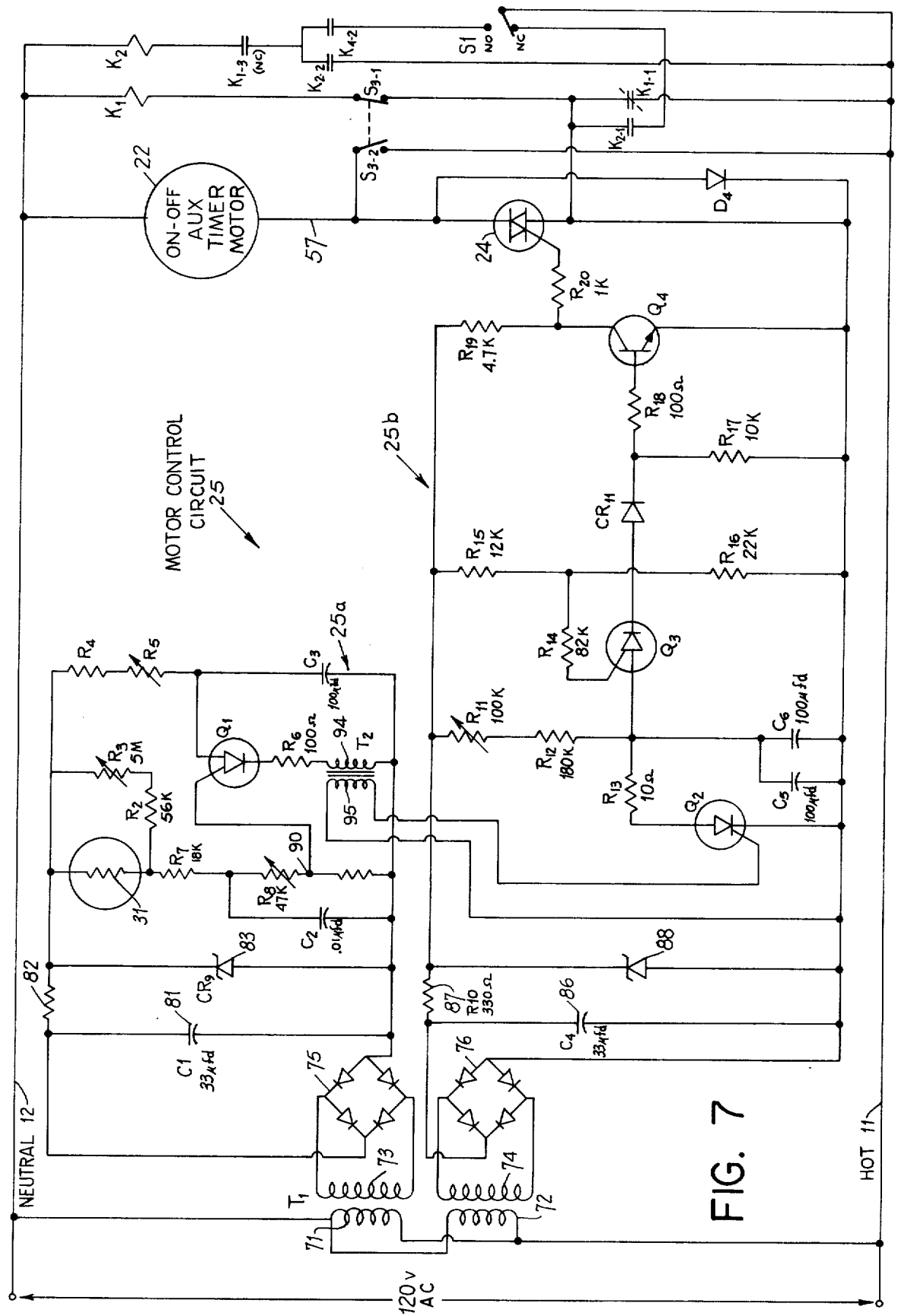
FIG. 7 is a schematic circuit diagram of the motor control circuit and various switching means of the system of FIG. 1.

The motor control circuit 25 that controls the on-off operation of triac 24 as a function of outside air, is illustrated in detail in FIG. 7. FIG. 7 also includes auxiliary timer motor 57 and its two auxiliary timer switches S$_{3-1}$ and S$_{3-2}$, relay winding K$_1$ and its contacts K$_{1-1}$ and K$_{1-3}$, relay winding K$_2$ and its contacts K$_{2-1}$ and K$_{2-2}$, and timer switch S$_1$ that is on seven day time scheduler 15. The switches and contacts in FIG. 7 are shown in the morning pickup positions of FIG. 6 before auxiliary timer switches S$_{3-1}$ and S$_{3-2}$ are transferred by ON tripper 52 of auxiliary timer 22.

In FIG. 7, on-off auxiliary timer motor 22 is coupled between the 120 volt a.c. power supply lines 11 and 12 by way of triac 24 and closed contacts K$_{1-1}$. The winding of relay K$_1$ is energized by way of its holding contacts K$_{1-1}$ and closed auxiliary timer switch S$_{3-1}$. With this arrangement, auxiliary timer motor 22 will rotate whenever triac 24 is rendered conductive.

Motor control circuit 25 is comprised of two parts, an upper part 25a and a lower part 25b. The d.c. power supply for the semiconductor devices of the control circuit is supplied by means of transformer T$_1$ that has parallel connected primary windings 71 and 72 connected across the a.c. power conductors 11 and 12. Respective secondary windings 73 and 74 are associated with the primary windings, and each secondary winding is coupled to its respective full wave bridge rectifier 75 and 76. Capacitor 81, resistor 82 and Zener diode 83 provide a 24 volt d.c. supply, for example, to the upper part 25a of the motor control circuit. Capacitor 86, resistor 87 and Zener diode 88 provide a 24 volt d.c. supply to the lower part 25b of the motor control circuit.

Each of the parts 25a and 25b of the motor control circuit includes a timing circuit and the two operate in a cooperative manner to control the on-off conduction of triac 24. In the upper part 25a of the control circuit, outside air temperature and wind sensor 31 is a temperature dependent resistor element, such as a thermistor element, that is connected in a voltage biasing circuit that include resistors R$_2$, R$_3$, R$_7$, R$_8$, and R$_9$. Capacitor C$_2$ is used for noise suppression. The junction 90 between resistors R$_8$ and R$_9$ is connected to the gate electrode 91 of programmable unijunction transistor (PUT) Q$_1$. Consequently, the voltage bias on gate electrode 91 of PUT Q$_1$ is a function of the outside air temperature and wind velocity. The anode electrode of PUT Q$_1$ is connected to a time-constant circuit comprised of resistors R$_4$, R$_5$ and capacitor C$_3$. The rate of voltage buildup on charging capacitor C$_3$ is a RC time constant provided by resistors R$_4$, R$_5$ and capacitor C$_3$. The circuit of PUT $Q_1$ is a well known relaxation oscillator of the type shown on page 513 of *Semiconductor Data Handbook*, third edition, copyright 1977, General Electric Company. The trigger voltage of PUT $Q_1$ is a function of the bias voltage applied to its gate 91. Consequently, the on and off times of the oscillator, i.e., the duty cycle, is a function of the outside air temperature and wind velocity. Each time PUT $Q_1$ conducts it energizes the primary winding 94 of transformer $T_2$ that is coupled through resistor $R_6$ to the cathode of PUT $Q_1$. The secondary winding 95 of transformer $T_2$ is energized with a repetitive series of pulses. The times between pulses (off time of PUT $Q_1$) are a function of the outside wind-chill factor. The colder it feels outside, the shorter is the period between pulses, assuming that temperature sensing element 31 is a thermistor that has a negative temperature coefficient of resistance.

Pulses on the secondary winding of pulse transformer $T_2$ are coupled to the gate electrode of silicon controlled rectifier (SCR) $Q_2$ in the bottom portion 25b of the motor control circuit.

Transistor $Q_3$ in bottom portion 25b of the control circuit is included in a second relaxation oscillator that functions as follows. Assuming for the moment that SCR $Q_2$ and PUT $Q_3$ are not conducting, capacitors $C_5$ and $C_6$ will begin to charge up through resistors $R_{11}$ and $R_{12}$. Because PUT $Q_3$ is not conducting, transistor $Q_4$ has no base drive current and is nonconducting. Because transistor $Q_4$ is not conducting, gate current is provided to triac 24 and it conducts. Consequently, a.c. current flows through auxiliary timer motor 22 and its time dial 50, FIG. 4, rotates.

When the charge on identical capacitors $C_5$ and $C_6$ builds up so that the voltage across them equals the trigger voltage of PUT $Q_3$, $Q_3$ conducts and applies base drive current to transistor $Q_4$. $Q_4$ then conducts and effectively connects together the gate and bottom terminal of triac 24, thereby turning off triac 24. PUT $Q_3$ remains conducting because sufficient drive current is provided by way of resistors $R_{11}$ and $R_{12}$. The values of resistors $R_{14}$, $R_{15}$, and $R_{16}$ are chosen to assure that PUT $Q_3$ will remain conducting. Triac 24 will remain off as long as $Q_3$ remains conducting.

From the above discussion it is seen that the ON time for triac 24 is governed by the OFF time of PUT $Q_3$, and this OFF time is governed by the charging time of capacitors $C_5$ and $C_6$.

The above discussion assumed that SCR $Q_2$ was off. $Q_2$ in fact is repetitively turned on by the pulses from pulse transformer $T_2$. When SCR $Q_2$ conducts it diverts drive current from PUT $Q_3$ and $Q_3$ ceases conduction. When $Q_3$ ceases conduction, $Q_4$ has insufficient base drive and it too ceases conduction and its collector goes high. Triac 24 then conducts and will remain conducting until $Q_2$ turns off and capacitors $C_5$, $C_6$ charge up sufficiently to again cause PUT $Q_3$ to conduct.

Thus, each time the relaxation oscillator $Q_1$ produces a pulse, triac 24 conducts and remains on for the time it takes capacitors $C_5$ and $C_6$ to charge up to the trigger voltage of PUT $Q_3$. The colder it feels outside the more frequently relaxation oscillator $Q_1$ produces pulses and the more frequently triac 24 is turned on to cause auxiliary timer motor 22 to be energized. On the contrary, when the outside air feels warmer, the resistance of temperature sensor 31 decreases and the bias voltage on gate 91 of $Q_1$ increases. This decreases the frequency of the relaxation oscillator and increases the time period between pulses applied to SCR $Q_2$. This means that triac 24 and auxiliary timing motor 22 is off for longer periods of time so that it takes a longer total elapsed time for the dial 50, FIG. 4, of auxiliary timer to turn a given angular increment equal to a continuous running time of 3 hours.

Referring again to FIG. 7, the diode $D_4$ is connected in parallel with triac 24. When the triac 24 is nonconducting, half-wave rectified pulses are conducted through auxiliary timer motor 22 and diode $D_4$. Because auxiliary timer motor is a synchronous motor, the half-wave pulses will cause a braking effect on motor 22 and will tend to lock it in place. This effect prevents coasting of motor 22 and assures that it will not rotate except when triac 24 is conducting and the full bi-polar a.c. voltage is applied to the motor.

In practice, the seven day time scheduler 15 illustrated in FIG. 3 is a Model No. X-7814, manufactured by Paragon Electric Company, Two Rivers, Wis. A synchronous motor and gear train rotate time dial 18 one complete revolution in seven days. A spring wound carry-over drive mechanism continues the rotation of time dial 18 for 10 hours in the event of a power failure. The carry-over mechanism is automatically rewound when power comes on again. Mechanisms of this type are well known and commonly used in time schedulers. One source for suitable mechanisms is Sonceboz Corporation, Plainview, N.Y. The scheduler is similar to the 7000 series 7-Day Time Control available from the same manufacturer, except for the switches $S_1$ and $S_2$. The timer switches $S_1$ and $S_2$ on the seven day time scheduler of FIG. 3 are identical precision snap switches such as Model No. V3-2101-D8, available from Micro Switch Division of Honeywell Corporation, Freeport, Ill. Each switch has a common terminal, a normally closed (NC) terminal that is connected to the common terminal when the actuating button is in its unactuated outermost position, and a normally open (NO) terminal that is connected to the common terminal when the actuating button is depressed.

Time dial 18 has an inner ring 101, FIG. 3, that has seven equiangular segments that contain the names of the days of the week, thereby assigning one angular segment to each day of the week. A next circumferential series of legends 102 designates the MIDNIGHT and NOON positions on the time dial, and provides light and dark segments that generally correspond to daylight and darkness hours throughout the week. The next series of legends are MORNING, AFTERNOON, EVENING, and NIGHT. Around the periphery of time dial 18 is a time scale that is divided into one-hour segments for establishing the time throughout each day. In practice, the time scale actually is divided into quarter hour segments. The scale has been simplified for purposes of this description and is divided only into hour segments.

To set the timing mechanism of FIG. 3 to the correct time of day, time dial 18 is rotated in the clockwise direction until pointer 109 is pointing to the correct time.

A settable A tripper and a settable B tripper are secured to the periphery of time dial 18 within each day segment that the building is to be occupied. If it is intended that the building will not be occupied on weekends, for example, no trippers will be placed on the segments of the dial for Saturday and Sunday. The A tripper will be set at the time that the building is to be occupied in the morning, 8:00 o'clock a.m. in the present example, and the B tripper is set at the time that night setback operation is to commence, i.e., 5:00 o'-clock p.m. in this discussion.

Switches $S_1$ and $S_2$ are placed at specified locations adjacent the periphery of time dial 18 so that it takes 11 hours for a tripper to move from switch $S_1$ to switch $S_2$. This eleven hours is an empirical number that has been arrived at based on the fact that the maximum warm up time to be expected for a building is eight hours, and it requires at least three hours of continuous running of auxiliary timer 22 for the auxiliary timer switches to transfer after the auxiliary timer is first energized by the transfer of timer switch $S_1$ to its NC position. On the seven day time scheduler of FIG. 3, tripper A trips timer switch $S_1$ to its NC position to condition the system for warm up operation and eleven hours later tripper A transfers timer switch $S_2$ to its NC position to put the system in daytime operation at occupancy time. Consequently, timer switch $S_1$ must be tripped to its NC position by tripper A eleven hours before occupancy time.

Figure 8:
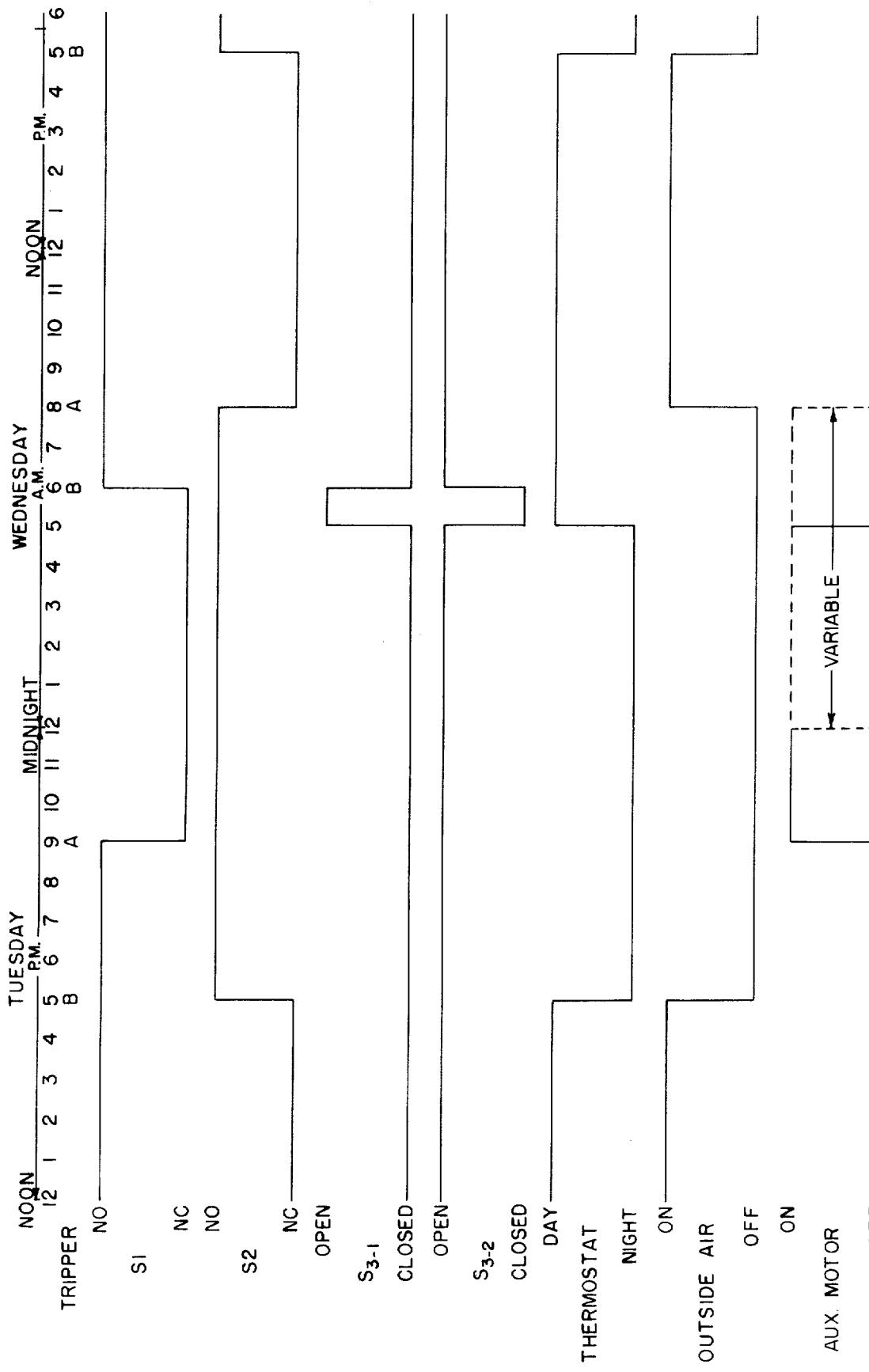
FIG. 8 is a timing diagram illustrating the functioning of various switches and relays of the system of this invention.

Using the example of this description, are referring to FIGS. 3 and 8, the B tripper is at 5:00 o'clock p.m. on Tuesday and transfers timer switch $S_2$ to its NO position at that time to set the system into night set back. Tripper A for Wednesday is set for the intended occupancy time of 8:00 o'clock a.m. This is 15 hours later than night set back occurred Tuesday night. Because the switches $S_1$ and $S_2$ are separated an angular distance corresponding to eleven hours on time dial 18, the dial 18 will rotate 4 hours (15-11=4), i.e., to 9:00 o'clock p.m., and then A tripper will transfer timer switch $S_1$ to its NC position to condition the system for morning pickup. When the following B tripper for Wednesday (set at the desired set back time of 5:00 o'clock p.m.) transfers timer switch $S_1$ back to its NO position nine hours later, nothing happens in the operation of the system because at this time, 6:00 o'clock a.m., switch $S_1$ already is out of the circuit by reason of the opening of contacts $K_{2-1}$ when relay $K_1$ was energized to open its contacts $K_{1-3}$ and deenergize relay $K_2$. Eleven hours later, i.e., 5:00 o'-clock p.m., B tripper on Wednesday arrives at timer switch $S_2$ and transfers it to its NO position to initiate night set back operation.

Details of the mounting arrangement and actuator mechanism for timer switches $S_1$ and $S_2$ are illustrated in FIGS. 3, 9, 10 and 11. Considering first switch $S_2$, it is positioned between two thin insulator cards 121, FIG. 3, and the entire assembly is fastened by means of screws 122 to a mounting surface 123 of the seven day time scheduler 15. Switch $S_2$ is not adjustable in position.

Figure 9:
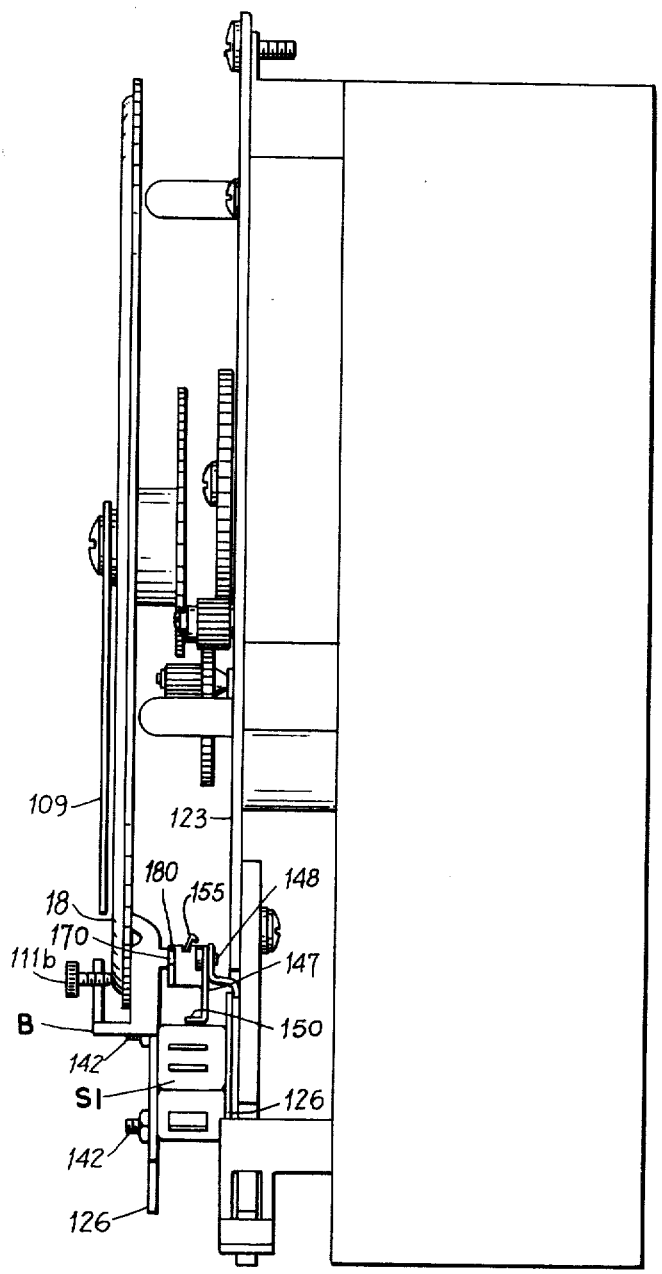
FIG. 9 is a side view of the time scheduler of FIG. 3.
Figure 11:
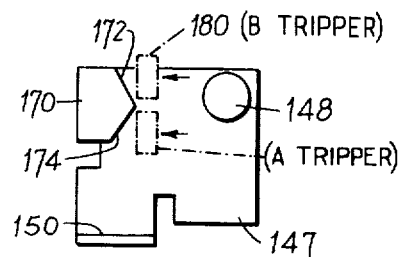
FIG. 11 is a simplified illustration of a switch actuator and its operation.
Figure 10:
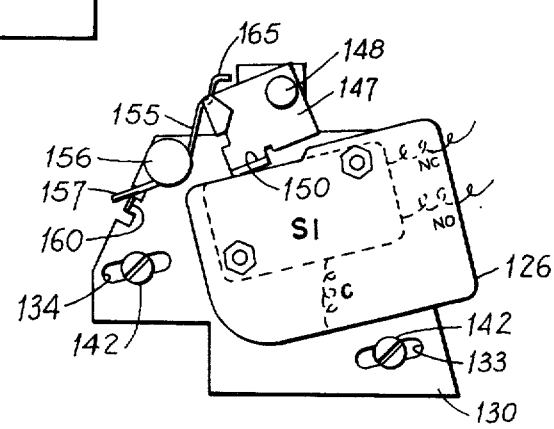
FIG. 10 is a detailed illustration of the switch assembly of time switch $S_1$.

Timer switch $S_1$ also is positioned between two insulator cards 126, FIGS. 9 and 10 and this assembly is secured to a mounting plate 130. Plate 130 has two elongated mounting holes 133 and 134 therein and mounting screws 142 secure the entire assembly to mounting surface 123 of seven day time scheduler 15. The elongated mounting holes 142 permit an adjustment of the exact spacing, and thus time relationship, between timer switches $S_1$ and $S_2$.

Pivotable actuators 146 and 147 are part of the respective assemblies of switches $S_1$ and $S_2$. As best seen in FIG. 10 with regard to switch $S_1$, pivotable actuator 147 pivots about its pivot pin 148. As best seen in FIGS. 9 and 10, pivotable actuator 147 has a bottom horizontally extending arm that is in registration with the actuator button on the snap switch $S_1$. When pivotable actuator 147 is pivoted to its lower position illustrated in FIGS. 9 and 10 it pushes in the switch button to close the switch on its NO contact. When pivotable actuator 147 is pivoted clockwise from the position of FIG. 10 arm 150 is away from the switch button and the button extends outwardly from the switch case. In this position the switch is closed on its NC contact.

A resilient wire spring member 155, FIG. 10 is wound about post 156 and has its tail end 157 held against a tab 160 punched out from the edge of mounting plate 130. The right leg of spring 155 has a V-shaped indentation 163 intermediate its length. When pivotable actuator 147 is rotated counter-clockwise to the position illustrated in FIG. 10, the V-shaped indentation 163 in spring 155 engages a cam arm 170, FIG. 9, that extends outwardly from the pivotable actuator 147 and holds actuator arm 150 on the switch actuator button. When pivotable actuator 147 is rotated clockwise to disengage from the actuator button of switch $S_1$, a hook 165 on the right end of spring member 155 catches cam arm 170 and stops actuator 147 from further rotation. The bias of spring 155 acts against actuator to hold it in both of its extreme positions just described.

The means for pivoting actuator 147 now will be described. In FIG. 9 it is seen that the portion of tripper B that is on the inside of time dial 18 has a trip finger 180 extending to the right and in the path of cam arm 170 on actuator 147. As seen best in FIG. 11, cam arm 170 has two inclined cam surfaces 172 and 174. It is seen that trip finger 180 on B tripper will intercept cam surface 172 and pivot actuator 147 in the counterclockwise direction.

The trip finger on the A tripper is positioned nearer the periphery of time dial 18 so that its path of travel will intercept cam surface 174 and pivot actuator 174 in the clockwise direction.

If the building is not to be occupied on Saturday and Sunday, no trippers A or B will be attached to timer dial 18 for those days. Therefore, Friday evening at 5:00 o'clock p.m. B tripper will transfer time switch $S_2$ to its NO position to initiate night set back condition. The system will remain in this condition until 9:00 o'clock p.m. Sunday night when A tripper transfers switch $S_1$ to its NC position to start auxiliary timer 22 and initiate the morning pickup condition.

By referring to FIGS. 3 and 8 it is seen that the A tripper for Wednesday is set at 8:00 o'clock a.m., the time for occupancy of the building. In FIG. 8 it is seen that outside air will turn on, or be enabled, when that A tripper transfers timer switch $S_2$ to its NC position. It may be desired, or required, that outside air be turned on a short time prior to occupancy. This may be accomplished by setting the A tripper at 7:30 a.m., for example. Now, A tripper will transfer timer switch $S_2$ to its NC position at 7:30 a.m. and relay KOA will be deenergized to close its KOA-1 contacts, FIG. 2b, to admit outside air to the building.

By looking at FIG. 3a and the switching condition for timer switch $S_1$ it will be seen that if A tripper is advanced one-half hour to 7:30 a.m. it will trip switch $S_1$ to its NC position one-half hour earlier the previous night to begin the running of auxiliary timer 22. If it is not desired to advance this time, the position of switch $S_1$ may be adjusted by loosening the screws 142, FIGS. 3 and 10, and sliding the mounting plate 130 to the left. The elongated mounting holes 133 and 134 may provide up to one hour of adjustment.

The system of this invention is extremely useful in that it functions automatically to afford optimum comfort and economy of operation. The system automatically compensates for outside air temperature and wind velocity to bring the building temperature up to comfortable level (daytime temperature) by the time workers begin work in the morning. The system is designed to operate so that the daytime temperature will not be reached appreciably before starting time, thereby not wasting heating fuel.

Because the thermal characteristics of different buildings are different, particular adjustments may be required in the system to make it compatible with each building. This is easily accomplished in this system by changing the setting of tripper 52 on auxiliary timer 22, FIG. 4, so that the exact time of opening of auxiliary timer switch $S_{3-1}$ and the exact time of closing of auxiliary timer switch $S_{3-2}$ may be adjusted. Such an adjustment will cause setback relay KSB to be deenergized sooner or later, thereby lengthening or shortening the early morning warm up time. Extremely precise adjustment of auxiliary timer 22 is possible since its time dial covers only a total of four hours.

It is an advantageous feature of this invention that the above-discussed adjustment of the auxiliary timer operation may be accomplished without in any way affecting the stopping, or indexing, of the auxiliary timer at the exact position where it is ready to begin its next timing operation. This results from the fact that the setting of tripper 52 is independent of the setting of tripper 54. The provision of switch $S_{3-2}$ and its closing after the day thermostat is reactivated permits auxiliary motor 22 to run continuously until tripper 54 opens switch $S_{3-1}$ and stops the timer at its proper starting or indexed position. Thus, no adjustment, reset, or rewind operation is necessary to properly index the auxiliary timer, no matter what is done to tripper 52 within its limits of adjustments. This automatic resetting of the auxiliary timer will occur automatically after a power failure with the system in the setback condition illustrated in FIG. 5. This eliminates the need for an attendant to come and reset the system.

Although the system has been described above in connection with a heating system, it also will operate with similar effectiveness in connection with a cooling system. The particular type of temperature altering means, whether it is a furnace, heat pump, air conditioning unit, etc., will be effectively and efficiently controlled by the system of this invention.

It is to be understood that the building may have multizone temperature control, in which case a plurality of temperature control means (thermostats) and associated equipment will be controlled by the system of this invention.

In its broader aspects, this invention is not limited to the specific embodiment illustrated and described. Various changes and modifications may be made without departing from the inventive principles herein disclosed.

We claim:

1. In a temperature control system that maintains first temperature within a building during a first period of time and a second temperature within the building during at least a portion of a second period of time, wherein said periods of time repetitively follow each other, said system operating to automatically change said temperatures in an economical manner so that the temperature reaches said first temperature substantially at the time the first period begins, regardless of the characteristics of the outside air, wherein the system includes thermostat means for controlling the operation of a temperature changing controller means to maintain said first temperature within said building during said first period and said second temperature within said building during at least a portion of said second period, said system comprising a first time scheduler continuously operable over a period of time that includes at least one first period and one second period, an auxiliary timer, said auxiliary timer being operable to run in a given direction from its beginning condition and to arrive again at its beginning condition after reaching a predetermined time indication, auxiliary timer control means operable to control the running of the auxiliary timer, sensing means for sensing a characteristic of air outside the building, said sensing means being operably coupled to the auxiliary timer control means for controlling the running of the auxiliary timer as a function of said sensed air characteristic, means operable in response to said timer scheduler at the conclusion of the first period for actuating the thermostat means from a first to a second condition that will cause the temperature changing controller means to maintain said second temperature within the building during at least a portion of said second period, auxiliary timer actuating means operable by said time scheduler at a predetermined number of hours before the next occurrence of the first period for initiating operation of the auxiliary timer under control of the auxiliary timer control means, means operable in response to the running of said auxiliary timer to a given intermediate condition under control of said sensing means for operating said thermostat means to its first condition to control the building temperature at said first temperature, means operable in response to said auxiliary timer when said intermediate condition has been reached for continuously running the auxiliary timer in said given direction independently of said sensing means and for stopping the auxiliary timer at its beginning condition, means operable in response to said time scheduler after the thermostat means returns to its first condition for maintaining the building at the first temperature and for conditioning the time scheduler to again actuate the thermostat means to its second condition when the next occupancy period ends.

2. The control system claimed in claim 1 wherein said first time scheduler is a multiple day scheduler having a time-of-day scale at least for days the building temperature is to be changed from the first to the second temperature, the scheduler further including first and second time switch actuator means positioned relative to said scale for each of said days that the building temperature is to be changed from the first to the second temperature, said scheduler further including first and second time switches operatively positioned relative to said actuators to be transferred between first and second conditions by said first actuator and to be transferred between said second and first conditions by the second actuator, the first actuator means being set relative to said scale to change the first time switch from a first to a second condition a given number of hours before the beginning of said first period and to change the second time switch from its first to its second condition at or near the commencement of said first period, the second actuator means being set relative to said scale to transfer the second time switch from its second to its first condition at the beginning of the second period and to transfer the first switch from its second to its first condition prior to the beginning of the subsequent first period but after the thermostat means is returned to its first condition by said means operable in response to the running of the auxiliary timer to said given intermediate condition.

3. The combination claimed in claim 2 wherein said auxiliary timer includes a timer that has a complete timing cycle of continuous running at a given speed that is shorter than the duration of said second period, and first and second auxiliary timer switches that are opened and closed, respectively, by said timer when it reaches said intermediate condition, and closed and opened, respectively, when the timer arrives at its beginning condition, said second auxiliary timer switch when in its closed condition directly energizing the auxiliary timer to run at its given speed independently of said air sensing means.

4. The temperature control system claimed in claim 3 wherein said auxiliary timer control means includes means for causing the auxiliary timer to run with repetitive on-off periods, means including said outside air sensor for controlling the durations of the off periods of the auxiliary timer as a function of sensed outside air, and means for providing a fixed time period for controlling the on times of the auxiliary timer.

5. The combination claimed in claim 3 wherein said second time switch when in its second condition energizing a first relay means whose operation energizes second and third relay means, said second relay means being energized through contacts of said first relay means, the first time switch in its first condition, and closed contacts of an unenergized fourth relay means, said second relay means having holding contacts that shunt said contacts of the first relay means and the first time switch, said third relay means being energized through different contacts of the first relay means and a normally closed, manually operable, override switch, the third relay means having holding contacts that shunt said different contacts of the first relay means, a normally open, manually operating restore switch shunting the holding contacts of the third relay means, said fourth relay means being initially energized through the closed first auxiliary switch, other contacts of the second relay means and the first time switch in its second condition, the fourth relay means having holding contacts that shunt said other contacts of the second relay and the first time switch, said auxiliary timer control means energizing said auxiliary timer through said other contacts of the second relay means and first time switch in its second condition and alternatively through said holding contacts of the fourth relay means.

6. The combination claimed in claim 5 wherein said first time scheduler normally is electrically powered, said scheduler further including mechanically operated scheduler driving means for continuing the operation of said scheduler for a preselected number of hours in the event of an electrical power failure, whereby the described system automatically will resume its scheduled operation at least by the second occurrence of the second period following restoration of power after a failure that does not exceed said preselected number of hours of operation of said mechanically operated means.

7. A temperature control system for maintaining a first temperature within a building during a first period of time and a second temperature within the building during at least a portion of a second period of time, wherein said periods of time repetitively follow each other, and for automatically changing said temperatures in an economical manner so that the temperature reaches said first temperature substantially at the time the first period begins, regardless of the characteristics of the outside air, said system comprising temperature changing controller means for controlling the operation of means for changing the temperature within a building, temperature control means for controlling the operation of said temperature changing controller means to maintain said first temperature within said building during said first period and said second temperature within said building during at least a portion of said second period, a first time scheduler continuously operable over a period of time that includes at least one first period and one second period, an auxiliary timer, said auxiliary timer being operable to run in a given direction from its beginning condition and to arrive again at its beginning condition after reaching a predetermined time indication, auxiliary timer control means operable to control the running of the auxiliary timer, sensing means for sensing a characteristic of air outside the building, said sensing means being operable coupled to the auxiliary timer control means for controlling the running of the auxiliary timer as a function of said sensed air characteristic, means operable in response to said timer scheduler at the conclusion of the first period for actuating the temperature control means from a first to a second condition that will cause the temperature changing controller means to maintain said second temperature within the building during at least a portion of said second period, auxiliary timer actuating means operable by said timer scheduler at a predetermined number of hours before the next occurrence of the first period for initiating operation of the auxiliary timer under control of the auxiliary timer control means, means operable in response to the running of said auxiliary timer to a given intermediate condition under control of said sensing means for operating said temperature control means to its first condition to control the building temperature at said first temperature, means operable in response to said auxiliary timer when said intermediate condition has been reached for continuously running the auxiliary timer in said given direction independently of said sensing means and for stopping the auxiliary timer at its beginning condition, means operable in response to said time scheduler after the temperature control means returns to its first condition for maintaining the building at the first temperature and for conditioning the time scheduler to again actuate the temperature control means to its second condition when the next occupancy period ends.

8. The temperature control system claimed in claim 7 wherein said auxiliary timer control means includes means for causing the auxiliary timer to run with repetitive on-off periods, means including said outside air sensor for controlling the durations of the off periods of the auxiliary timer as a function of sensed outside air, and means for providing a fixed time period for controlling the on times of the auxiliary timer.

9. A temperature control system comprising temperature changing control means for controlling the operation of means for changing the temperature within a building, temperature control means for controlling the operation of said temperature changing control means to maintain a first temperature within said building during an occupancy period of the building and a second temperature within said building during at least a portion of an unoccupied period, a first time scheduler continuously operable over a period of time that includes at least one occupancy period and one unoccupied period of the building, an auxiliary timer, said auxiliary timer being operable to run in a given direction from its beginning condition and to arrive again at its beginning condition after reaching a predetermined time indication, auxiliary timer control means operable to control the running of the auxiliary timer, temperature sensing means for sensing the temperature of air outside the building, said temperature sensing means being operably coupled to the auxiliary timer control means for controlling the running of the auxiliary timer as a function of sensed outside air temperature, means operable in response to said time scheduler at the conclusion of the occupancy period for actuating the temperature control means to a second condition that will cause the temperature changing control means to maintain said second temperature within the building during at least a portion of said unoccupied period, auxiliary timer actuating means operable by said time scheduler at a predetermined number of hours before the building is to be again occupied for initiating operation of the auxiliary timer under control of the auxiliary timer control means, means operable in response to the running of said auxiliary timer to a given intermediate condition under control of said temperature sensing means for operating said temperature control means to its first condition to control the building temperature at said first temperature, means operable in response to said auxiliary timer after said intermediate condition has been reached for continuously running the auxiliary timer independently of sensed outside air temperature and for stopping the auxiliary timer at its beginning condition, means operable in response to said time scheduler after the temperature control means returned to its first condition for maintaining the building at the first temperature and for preparing the time scheduler to again actuate the temperature control means to its second condition when the next occupancy periods ends.

10. A temperature control system for a building comprising temperature changing control means for producing a change in temperature in said building, a first time scheduler having at least two time tripper means associated therewith, auxiliary timing means constructed and arranged to run in a given direction from a start condition and to arrive back at the start condition after running a given accumulated running time, temperature control means for maintaining the building at a first or a second temperature, control switching means coupled with said temperature control means for controlling the actuation of the temperature control means, a first switch means operable in response to said first tripper means and cooperating with said control switching means for actuating said temperature control means from a first to a second condition at a time when the building temperature is to be changed from a first to a second temperature, a second switch means operable in response to said second tripper means for energizing said auxiliary timer a predetermined number of hours before the building temperature is to be returned to the first temperature, sensing means for sensing the outside air temperature and wind velocity, auxiliary timer control means responsive to said sensing means for controlling the running time of the auxiliary timer means as a function of the sensed air temperature and wind velocity, first auxiliary switching means associated with the auxiliary timer and operable on said control switching means for transferring said temperature control means from its second to its first condition when the auxiliary timer means has accumulated a total running time of predetermined length, second auxiliary switching means associated with the auxiliary timer means and operable when the auxiliary timer means has accumulated said predetermined length of running time for continuously running the auxiliary timer means independently of the sensing means until the auxiliary timer accumulates said given accumulated running time, and then stopping the auxiliary timer means at its start condition, said second tripper means of the first time scheduler returning the first switch means to its first condition at or near the time the building first temperature is to be arrived at, said first tripper means returning the second switch means to its first condition before the second switch means is returned to its first condition.

11. A temperature control system comprising temperature changing control means for controlling the operation of means for changing the temperature within a building, temperature control means for controlling the operation of said temperature changing control means to maintain a first temperature within said building during an occupancy period of the building and a second temperature within said building during at least a portion of an unoccupied period, a first time scheduler continuously operable over a period of time that includes at least one occupancy period and one unoccupied period of the building, an auxiliary timer, said auxiliary timer being operable to run in a given direction from its beginning condition and to arrive again at its beginning condition after an accumulated running time of predetermined length, auxiliary timer control means operable to control the running of the auxiliary timer, temperature sensing means for sensing the air temperature and wind velocity outside the building, said temperature sensing means being operatively coupled to the auxiliary timer control means for controlling the running of the auxiliary timer as a function of sensed outside temperature and wind, means operable in response to said time scheduler at the conclusion of the occupancy period for actuating the temperature control means to a second condition that will cause the temperature changing control means to maintain said second temperature within the building during at least a portion of said unoccupied period, auxiliary timer actuating means operable by said time scheduler at a predetermined number of hours before the building is to be again occupied for initiating operation of the auxiliary timer under control of the auxiliary timer control means, means operable in response to the running of said auxiliary timer a given accumulated running time under control of said temperature sensing means for operating said temperature control means to its first condition to control the building temperature at said first temperature, means operable in response to said auxiliary timer after said given accumulated running time has been reached for continuously running the auxiliary timer independently of sensed outside temperature and wind and for stopping the auxiliary timer at its beginning condition, means operable in response to said time scheduler after the temperature control means returned to its first condition for maintaining the building at the first temperature and for preparing the time scheduler to again actuate the temperature control means to its second condition when next occupancy period ends.

12. In a system for automatically controlling the temperature of a building, wherein the system includes means for automatically changing the temperature control means when the building is unoccupied, and further includes improved means automatically operating as a function of at least outside air temperature to establish a desired temperature for occupancy by the time the building is reoccupied, said improvement comprising, first and second temperature control means selectively connectable to temperature changing means for controlling, respectively, the temperature of at least a portion of said building when the building is occupied and when it is unoccupied, means for sensing at least the temperature of the air outside said building, first timing means for providing first, second and third time schedulers that correspond to the time when the building is to be vacated, occupied, and again vacated, auxiliary timer means for providing a variable length timing period, said auxiliary timer being capable of running in a given direction for a given time period and then arriving at its beginning position, first switching means operable from a first to a second position in response to said first time scheduler at a time the building is to be vacated for connecting the second temperature control means in operative relationship with the temperature altering means, second switching means operable from a first to a second position in response to said second time scheduler for energizing said auxiliary timer means a given number of hours before the building is to be again occupied, auxiliary timer control means responsive to said means for sensing outside air for controlling the running time of the auxiliary timer as a function of the sensed temperature, first auxiliary timer switch means operable from a first to a second position when the auxiliary timer has accumulated a total running time of predetermined length and cooperating with the first and second switching means for disconnecting the second temperature control means from operative relationship with the temperature changing means and for connecting the first temperature control means in operative relationship with the temperature changing means, second auxiliary timer switch means operable when the auxiliary timer has accumulated a total running time of said predetermined length for continuously running the auxiliary time independently of said outside air temperature sensing means, means associated with said auxiliary timer means for actuating the second auxiliary timer switch means to stop the running of the auxiliary timer at its beginning position and for returning the first auxiliary timer switch means to its first position, said second time scheduler transferring the second switching means back to its first position at or near the time the building is to be again occupied, said third time scheduler operating to transfer the first switching means back to its first position prior to the time the second switching means transfers back to its first position.

13. The temperature control system claimed in claim 12 wherein said auxiliary timer control means includes means for causing the auxiliary timer to run with repetitive on-off periods, means including said outside air sensor for controlling the durations of the off periods of the auxiliary timer as a function of sensed outside air, and means for providing a fixed time period for controlling the on times of the auxiliary timer.

* * * * *

UNITED STATES PATENT AND TRADEMARK OFFICE
CERTIFICATE OF CORRECTION

PATENT NO. : 4,176,785
DATED : December 4, 1979
INVENTOR(S) : John J. Allard et al.

It is certified that error appears in the above—identified patent and that said Letters Patent is hereby corrected as shown below:

Column 14, Claim 1, line 23, "timer" should read -- time --.

Column 16, Claim 7, line 50, "operable" should read read -- operably --.

Signed and Sealed this

Eighteenth Day of March 1980

[SEAL]

Attest:

SIDNEY A. DIAMOND

Attesting Officer

Commissioner of Patents and Trademarks